United States Patent [19]

Hawkins et al.

[11] 4,358,213

[45] Nov. 9, 1982

[54] JOINING MEMBER AND/OR A JOINT

[75] Inventors: Harold R. Hawkins; Clive A. Gardner; Lindsey J. Roke; Richard J. Clark; Warwick F. Rumble, all of Auckland, New Zealand

[73] Assignee: Fishel & Paykel Limited, Auckland, New Zealand

[21] Appl. No.: 71,496

[22] Filed: Aug. 31, 1979

[30] Foreign Application Priority Data

Sep. 7, 1978 [NZ] New Zealand .................. 188367

[51] Int. Cl.³ ............................. F16B 1/00; F16B 9/00
[52] U.S. Cl. ................................... 403/231; 403/205; 403/403; 52/656
[58] Field of Search ............... 403/231, 402, 403, 205; 52/656

[56] References Cited

U.S. PATENT DOCUMENTS

| 154,953 | 9/1874 | Kelley et al. ...................... 403/205 |
| 3,380,768 | 4/1968 | Wolfensberger ............... 403/205 X |

FOREIGN PATENT DOCUMENTS

| 274115 | 10/1965 | Australia ........................... 403/231 |
| 2525168 | 12/1976 | Fed. Rep. of Germany ........ 52/656 |
| 1253291 | 1/1961 | France ................................ 403/205 |
| 19705 | 1/1910 | Norway .............................. 403/205 |
| 4146 | of 1910 | United Kingdom ............... 403/205 |

Primary Examiner—James Kee Chi
Attorney, Agent, or Firm—Holman & Stern

[57] ABSTRACT

A corner molding for joining in particular the front cross rail of a refrigerator to the side wall, the molding having a slot in a plane parallel to the surface of the body of the molding to receive the front cross rail and an abutment against which is engaged the side wall of the refrigerator.

16 Claims, 6 Drawing Figures

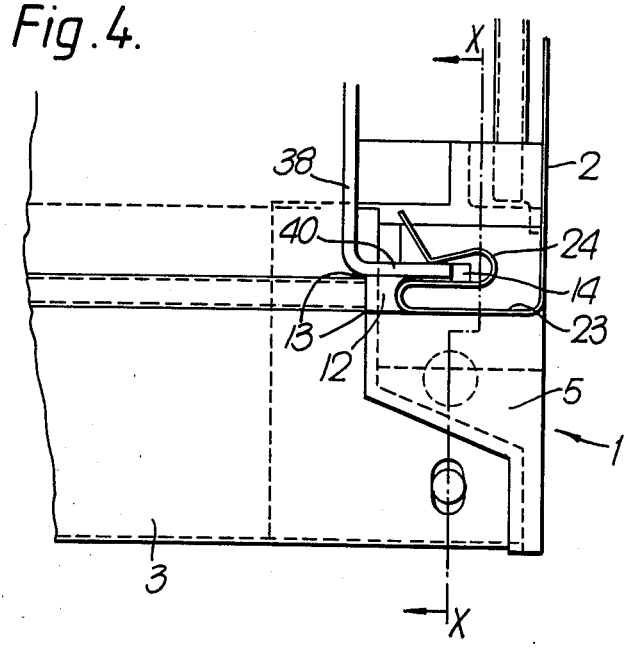
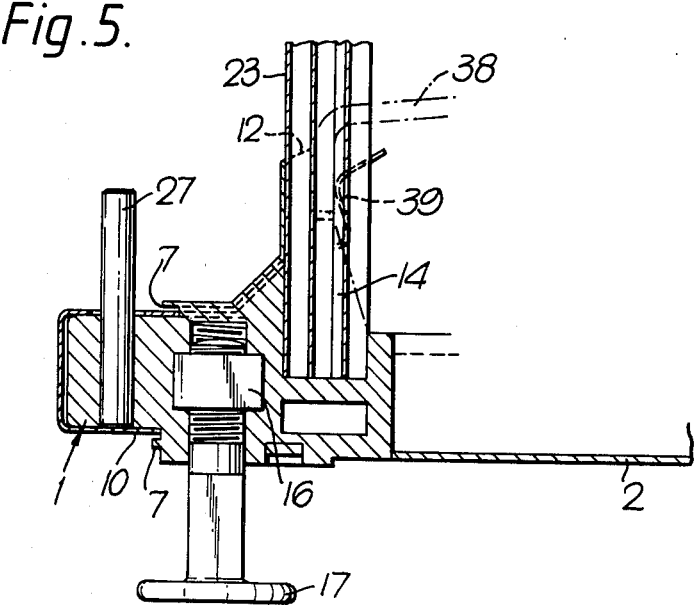

4,358,213

JOINING MEMBER AND/OR A JOINT

BRIEF SUMMARY OF THE INVENTION

This invention relates to a joining member and/or a joint and has been devised particularly though not solely for use as a joining member or joint for use in forming cabinets such as refrigerators.

It is an object of the present invention to provide a joining member and/or a joint which will at least provide the public with a useful choice.

Accordingly in one aspect the invention consists in a joining member comprising a body, flanges on at least some exterior surfaces of the said body forming a slot lying in a plane substantially parallel to said surfaces of said body and an abutment extending from an outer surface of said body, said slot and said abutment being constructed and arranged to receive suitably shaped members so that said members are positioned so as to be in contact or closely adjacent one another over at least part of the areas thereof.

In a further aspect the invention consists in a joint comprising a joining member according to the preceding paragraph, a first member being substantially planar with a substantially perpendicular flange at one edge thereof, said flange terminating in a channel engagement onto said abutment, a second member having an edge shaped to engage in said slot and having further parts extending over part of the surface of said joining member so that parts of the first and second member are positioned adjacent one another, and lock means to enable said adjacent parts of said first and second members to be engaged one with the other.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

One preferred form of the invention will now be described with reference to the accompanying drawings in which, FIG. 4 is a plan view of a joining member according to the invention in use to join a pair of members, FIG. 5 is a cross-section taken along line X—X in FIG. 4.

DETAILED DESCRIPTION

Figure 1:
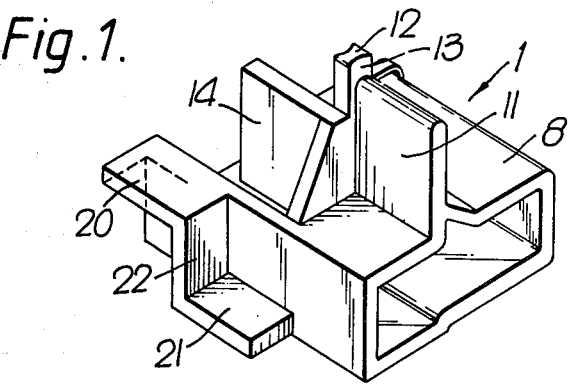
FIGS. 1, 2 and 3 are respectively rear top perspective view, front top perspective view and an underside perspective view of a joining member according to the invention.
Figure 2:
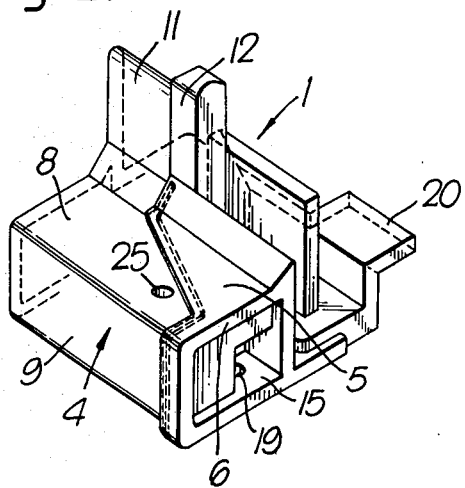
Figure 3:
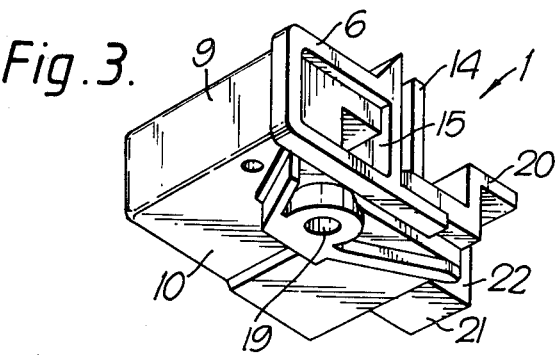
Figure 6:
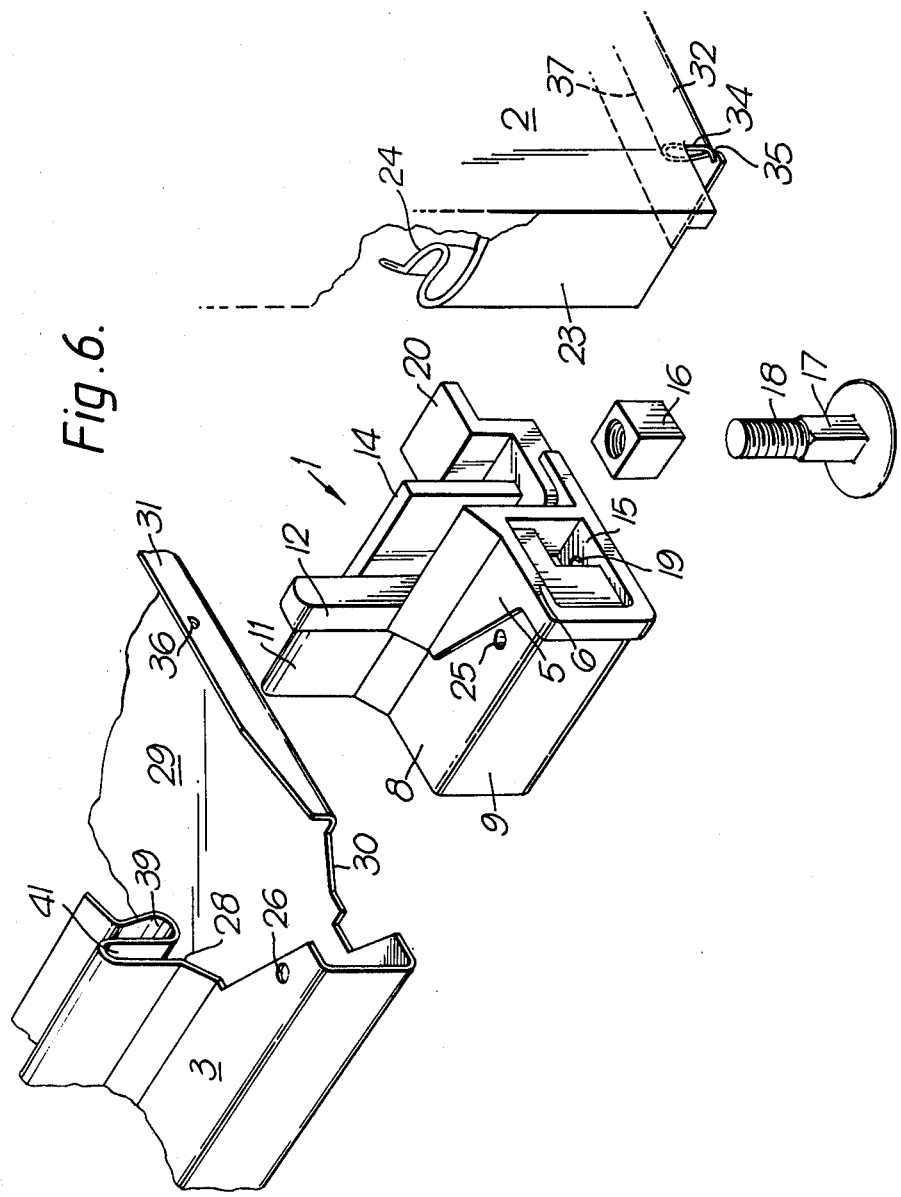
FIG. 6 is an exploded perspective view of a joining member, a first member and a second member for use in the invention.

In the preferred form of the invention a joining member 1 is provided which is adapted to join a pair of members, for example, members 2 and 3.

The members 2 and 3 may be any desired members and in the embodiment here being described the member 2 comprises the side wall of a refrigerator cabinet and the member 3 comprises the front cross rail and underneath wall of a refrigerator cabinet. It will be apparent, however, that the invention, particularly in its broadest aspect may be used in many other constructions. In the preferred form of the invention the outwardly facing surfaces of the members 2 and 3 are "finished" with an enamel paint or other wearing/or decorative coating prior to assembly and preferably prior to shaping.

The joining member 1 is formed from a body 4 and from at least some of the outer surface of the body 4 extends a flange 5 which is separated from the body 4 by a web indicated at 6 so as to form a slot 7, for example, see FIG. 5. The slot 7 is provided on at least two surfaces 8 and 9 which are preferably substantially at right angles but the slot may also extend onto the undersurface 10 of the joining member 1 and preferably does so extend. The extent of the slot 7 adjacent the surfaces 9 and 10 is preferably of a relatively small extent and it will be appreciated that the slot extends inwardly in a plane substantially parallel to the surface of the body 1 to which it is adjacent.

In the particular embodiment of the invention described, a rib 11 is provided which has an enlarged portion 12 so as to provide an abutment 13 preferably on the top and both sides of the rib 11.

An abutment is provided on the outer surface of the joining member and the abutment may comprise a rib 14 which preferably lies in a plane substantially parallel to the plane in which the rib 11 lies and is preferably at right angles to the surface of body 4 from which the rib 11 rises. The slot 7 is provided so that the member 3 may be engaged therein and the rib 14 is provided so that the member 2 can be engaged therewith as will be described further later.

The body 1 is provided with a depression 15 into which a keying member is positionable so that a further member may be keyed thereinto. The keying member may be a nut 16 and the nut 16 and the depression 15 are shaped such that the nut 16 will not rotate within the depression 15. The member to be positioned therein may comprise a foot for example, a foot 17, including a threaded stem 18 which passes through an aperture 19 in the underside of the part of the body 4 and into the depression 15. Thus, the threaded stem 18 may be passed through the aperture 19 for engagement with the nut 16 which has been slid into the depression 15.

The joining member may also have other features thereon such as a lug or extension 20 against which parts, for example, of the member 2 may be located and a further lug 21 against which further parts of, for example, the member 3 may be located and also a strengthening or joining part 22.

It will be apparent that other extensions, lugs and the like may be provided as required by the specific uses to which the joining member is to be put.

The joining member may be formed as desired and, for example, it is envisaged that the joining member described above will be formed by moulding processes from plastics material or cast in a metal such as zinc die casting.

According to the invention a joint may be formed and to this end, members 2 and 3 are provided. The member 2 may comprise a substantially planar member for example the side wall of a refrigerator housing, having a substantially perpendicular flange 23 extending from one edge thereof and the flange 23 may terminate in a channel 24 formed, for example, by roll forming.

The member 3 is formed to a profile at one edge thereof so that parts of the member may be slid into the slot 7 and a locating means may be provided between the member 3 and the joining member 1, for example, by providing apertures such as apertures 25 in the body 1 and corresponding apertures 26 in the member 3 through which a pin 27 may be placed which may form, for example, a hinge pin for mounting a refrigerator door or otherwise as required. The door may therefore be hung at the left or the right hand side of a cabinet including body 1. Where a door is not to be hung, the pin may be shorter or replaced by a plug.

Thus the edge 28 is passed into the slot 7 and fixed therein by inserting the pin 27.

In the embodiment described a part 29 of the member 3 then extends below the joining member 1, the cut out portion 30 filling in the slot if provided on the undersurfaces 10 of the joining member. The part 29 extends to be adjacent the edge 32 of the member 2 and a lock member is provided between these two parts. For example, the lock means may comprise a flange 31 on the part 29 and a channel 34 formed along the edge 32. In order to further lock the construction the flange 31 may be provided with lanced out areas 36 and channel 34 is narrowed at its mouth by an inwardly extending flange 35. Thus, when the parts become adjacent the flange 31 can be passed into the channel 34 by forcing the flange 31 so that the lanced out portions will engage in channel 34 and will be substantially prevented from being withdrawn.

The upper edge 37 of the channel 34 will rest against the underside of the abutment 20 and the upper surface of the part 29 of member 3 will rest against the underside of the flange or lug 21.

In use, the joining member and the joint may be formed in particular, to form joints or corners in constructions such as cabinets, for example, refrigerator cabinets and these are formed by bringing the members into engagement with the joining member as above described and, for example, the channel 24 is engaged over the rib 14.

The construction also allows, for example, part of a refrigerator liner 38 to be positioned into a channel 39 formed, for example, by roll forming on the member 3 and also the side flange 40 of the liner 38 can be engaged into the channel 24, for example, beside the rib 14. An inverted channel 41 on member 3 is able to engage over rib 11, the end faces preferably butting against the faces 13. The foot 17, where provided, may be readily fitted and adjustable and the construction is substantially locked together by means of the pin 27 which locate the member 3 relative to the joining member and the member 3 then holds the member 2 in position by means of the engagement between the flange 31 and channel 34.

Thus, it can be seen that at least in the preferred form of the invention a joining member and/or a joint are provided which have some advantages. In particular, the shaping of the members to be joined can be accomplished by suitable mechanical operations and also the joining member itself may be formed, for example, by moulding. The actual assembly of the joint may be quickly made particularly once some expertise at the joggling movements that may be necessary to allow the particular engagements to be made are mastered. Also, the joint is neat in appearance at least in the construction so formed.

By suitable selection of pins in the joining member doors may be hung left or right handed with respect to a cabinet including such pins.

We claim:

1. A joining member comprising a body, a flange on at least two exterior surfaces of said body having surfaces in parallel spaced relationship to said surfaces of said body forming a slot lying in planes substantially parallel to said surfaces of said body and an abutment extending from an outer surface of said body, said slot and said abutment being constructed and arranged to receive suitably shaped members so that said members are positioned so as to be closely adjacent one another over at least the parts thereof received by said slot and abutment.

2. A joining member as claimed in claim 1 wherein said abutment is substantially planar and the plane of said abutment is substantially perpendicular to the plane of the part of said surface of said body from which said abutment extends.

3. A joining member as claimed in claim 1 or claim 2 wherein said body includes upper, lower and side surfaces, and said slot extends over at least two surfaces of said body, said two surfaces of the body being substantially perpendicular one to the other and being respectively substantially parallel and substantially perpendicular to the plane of said abutment.

4. A joining member as claimed in claim 1 wherein said abutment is in the form of a rib.

5. A joining member as claimed in claim 4 wherein a further rib is provided on an external surface of said body.

6. A joining member as claimed in claim 5 wherein said further rib has an enlargement at one end thereof so that in use a member received by said further rib may butt against said enlargement.

7. A joining member as claimed in either claim 5 or claim 6 wherein said abutment rib and said further rib are substantially parallel.

8. A joining member as claimed in claim 1 wherein a depression is provided in said body to receive a keying member, an aperture being provided through said body to said depression to receive a foot member passable through said aperture to engage said keying member.

9. A joining member as claimed in claim 8 wherein said foot member includes a threaded rod and said keying member comprises a nut, the faces of said nut and the walls of said depression being shaped such that said nut is substantially prevented from rotating in said depression.

10. A joining member as claimed in claim 1 wherein locating means are associated with said slot operable to locate one of said suitably shaped members into said slot.

11. A joining member as claimed in claim 10 wherein said locating means comprises at least one aperture in one of said exterior surfaces of said body positioned to be aligned with a co-operating aperture in said one of said suitably shaped members and a pin member insertable through said aligned apertures.

12. A joint comprising a joining member as claimed in claim 1, wherein a first one of said suitably shaped members is substantially planar and has a flange at one edge thereof substantially perpendicular to its planar part, said last mentioned flange terminating in a channel engageable onto said abutment, a second one of said suitably shaped members has an edge shaped to engage in said slot and has further parts extending over part of the surface of said joining member so that parts of the first and second suitably shaped members are positioned adjacent one another, and lock means comprising interengaging members on said adjacent parts of said first and second suitably shaped members adapted to lock said adjacent parts together.

13. A joint as claimed in claim 12 wherein said lock means comprises a co-operating flange and channel on said first and second suitably shaped members.

14. A joint as claimed in claim 13 wherein said channel of said lock means is provided on said first one of said suitably shaped members and said cooperating flange is provided on said second one of said suitably shaped members.

15. A joint as claimed in claim 14 wherein said channel of said lock means has a narrowed section adjacent the mouth thereof and said cooperating flange has lanced out tabs thereon, said lanced out tabs being insertable through said narrowed section on said channel by resiliently deforming said channel so that said channel will regain its original shape, thus locking said rib in said channel by engagement of said lanced out tabs with said narrowed section.

16. A joint as claimed in claim 15 wherein said narrowed section is provided by forming an inwardly extending flange on the edge of said first one of said suitably shaped members on which said channel is provided.

* * * * *